F. M. LIVINGSTONE.
GASEOUS MIXER DEVICE.
APPLICATION FILED APR. 27, 1918.

1,345,791.

Patented July 6, 1920.

WITNESS:
R. M. Mowry.

INVENTOR,
Frank M. Livingstone,
BY
Harry M. Bown.
ATTORNEY.

UNITED STATES PATENT OFFICE.

FRANK M. LIVINGSTONE, OF SPRINGFIELD, MASSACHUSETTS, ASSIGNOR TO FUEL ECONOMY COMPANY, OF SPRINGFIELD, MASSACHUSETTS, AN ASSOCIATED TRUST OF MASSACHUSETTS.

GASEOUS MIXER DEVICE.

1,345,791.   Specification of Letters Patent.   Patented July 6, 1920.

Application filed April 27, 1918. Serial No. 231,152.

*To all whom it may concern:*

Be it known that I, FRANK M. LIVINGSTONE, a citizen of the United States of America, residing at Springfield, in the county of Hampden and State of Massachusetts, have invented certain new and useful Improvements in Gaseous Mixer Devices, of which the following is a specification.

This invention relates to improvements in devices for mixing or commingling the elements composing gaseous substances of various kinds, as, for example, the vapor of gasolene, or, illuminating gas, which, as is well known, is a mechanical mixture and not a chemical compound. An object of the invention is to provide a device for the purpose of imparting a rotary or circular motion to the gaseous or vaporous mixture as it is drawn by suction or forced by pressure through the device. The gaseous vapor arising from gasolene, is, when used in internal combustion engines, frequently drawn through the carbureter and into the engine cylinder in a condition in which the globules of the oil are not thoroughly broken up, resulting in partial or incomplete combustion of the vapor, loss of engine efficiency and consequent wastefulness of the fuel. It is a well known fact that the more thoroughly and completely air and gasolene vapor are commingled the more perfect the results. In illuminating gas it has been discovered that the elements composing the same naturally arrange themselves so that the heavier elements if present as carbon and sulfur, will settle or arrange themselves in the bottom, or lower portion of the pipe when the gas is not flowing through the pipe. This device is designed to thoroughly commingle or mix the elements of illuminating gas together, whereby when the gas emerges from the burner, either for illuminating or heating purposes, practically perfect combustion will be the result, resulting in the production of greater heating or illuminating properties.

The invention, broadly considered, comprises a member having a cylindrical formation with a plurality of curved blades or fingers, the inner edges of these blades or fingers meeting at the outlet end of the mixing device in the axial line of the member. The outer or free ends of the fingers of the member are located in a circle which is substantially equal to the internal diameter of the pipe in which the member is located, as a gas main or the manifold of an internal combustion engine.

Referring to the drawings.

Figure 1:
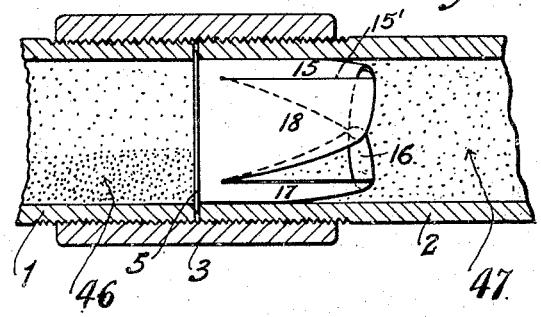
Figure 1 shows the mixing device located within a pipe representing a portion of the gas main through which the gas flows, the location of the device being indicated at the joint or meeting ends of the pipe where the coupling connects the two ends of the pipe together.

Referring to the drawings in detail:

1 and 2 indicate sections of the pipe through which the gaseous mixture is drawn, or forced. 3 is the coupling for connecting the ends of the pipe sections together. The blank from which the mixing device is formed is shown developed in Fig. 2. This blank, it will be noticed, is provided with a collar or rim portion 4 and a flange portion 5. Its outer or upper edge 6 is shown as being formed on a line parallel to rim 4. The outer ends 7 and 8 are perpendicular to the flange 5. The blank is formed with slits 11, 12 and 13, which extend from the outer edge 6 downward to a point in the line of the collar or rim. The number of slits determines the number of fingers in the finished article. As shown, three slits are formed in the blank which are parallel to the ends 7 and 8.

Figure 3:
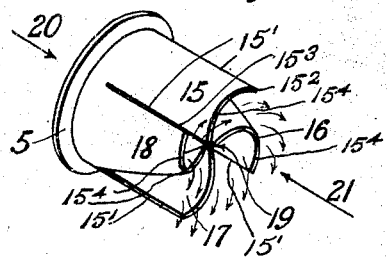
Fig. 3 is a perspective view of the finished article showing the fingers meeting at their inner ends in the axis of the device.

The diameter of the device is the same throughout its length, as shown in Fig. 3. When installed within the pipe section 2, it will closely fit the internal diameter of the pipe as shown in Fig. 1. By bringing the inner ends of the curved fingers 15, 16, 17 and 18 so as to meet at the central point 19, in the axis of the device, it is necessary to provide sufficient material above the line 14 in order to have the external diameter of the outer ends of the fingers equal to that of the inner ends of the fingers at their bases. Experience shows that the inner bent ends of these fingers at the delivery end must meet as otherwise the gas would be forced through the central part of the device without having any rotary motion imparted thereto, or in other words, it would escape in a straight line instead of in curved or rotary lines. As clearly showing that the diameter of the outer ends of the fingers is equal to that at their bases reference is made to Fig. 1, where the entire length of the device closely fits the inner surface of the pipe section 2. The outer or uncurved edges of the fingers are indicated in Figs. 1 and 3 by the reference numeral 15'.

Figure 4:
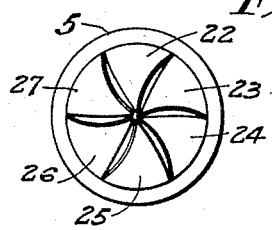
Fig. 4 is a view looking at the end of the mixing device from the outlet end, and indicating more fingers than are indicated in Fig. 3.

Reference to Fig. 4 shows a view looking from the left of Fig. 3 as indicated by the arrow 21. In this figure the number of fingers or spiral blades is increased over the number shown in Fig. 3, as indicated by the numerals 22, 23, 24, etc.

Figure 2:
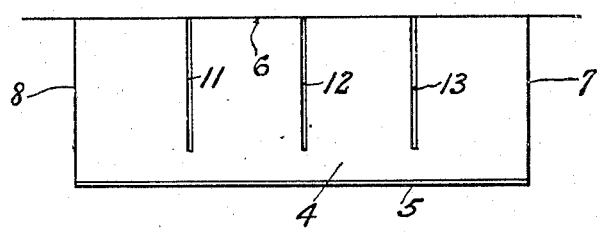
Fig. 2 is a development of the blank from which the device is formed, showing the slitted portions, which represent the dimensions of the fingers, also the depth or length of the fingers and the rim or collar.
Figure 5:
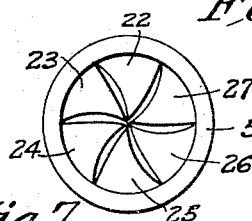
Fig. 5 is a view looking into the entrance end of the device, represented in Fig. 4.

In Fig. 5, which is a view looking from the inlet end of the structure shown in Fig. 3, the number of blades or fingers is greater than that shown in Fig. 3, the arrow 20 indicating the position of the observer as looking from the left of Fig. 3. The flange 5 of the mixer device as shown in Figs. 2 and 3 is clamped between the meeting ends of the pipe sections 1 and 2, which firmly holds the device in place.

Figure 6:
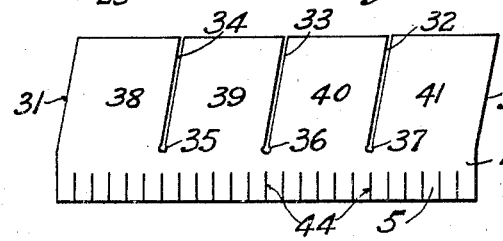
Fig. 6 is a modification of the blank shown in Fig. 2, in which the location of the slits are parallel with each other and the inclined ends.
Figure 7:
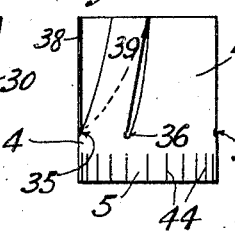
Fig. 7 is a view of the blank shown in Fig. 6 rolled into a cylindrical form.
Figure 8:
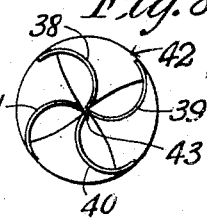
Fig. 8 is a view showing the device looking toward the delivery end.

Referring now to the construction shown in Figs. 6, 7 and 8; the blank form shown in Fig. 6, it will be observed, is formed with its inclined ends 30 and 31 inclined in the same direction to the vertical. Between these ends the blank is divided by the slits 32, 33 and 34, which are also inclined in the same direction and parallel with the ends 30 and 31. These slits, at their lower ends, terminate in circular openings 35, 36 and 37, the purpose of which is to prevent the fingers 38, 39, 40 and 41 when they are bent into the curved shape shown in Fig. 8, from being bent below this point.

Fig. 7 illustrates the idea that the external diameter of the mixing device is the same throughout its length. This feature is also clearly shown in Fig. 8 by the line 42. It will also be noticed that the inner ends of these fingers meet at the center 43. The flange 5 is slitted as indicated by the lines 44 for forming the flexible fingers in order to enable the device to be firmly clamped between the ends of the pipe sections and adapt themselves to any irregularities that may exist when the device is installed in the manifold of an internal combustion engine.

It will be observed from this description that I have produced a gas or vapor mixing device that is simple in construction, efficient in operation and that is inexpensive to construct and install.

The construction shown and described in connection with Figs. 1, 3, 4, and 5, is formed from a rectangular shaped blank illustrated in Fig. 2. The construction shown in Figs. 7 and 8 is formed from the blank shown in Fig. 6, which is of equal width throughout.

Fig. 1 indicates, by means of the stippled or dotted surface 46 the arrangement of the heavier elements composing illuminating gas as having settled in the lower or bottom portion of the pipe, when the gas is in a state of rest. 47 indicates the elements composing illuminating gas as having been thoroughly commingled or mixed together after the gas has been forced or drawn through the mixing device shown installed in the pipe section.

It will be observed from the figures that the extent of the curvature at the outer or delivery ends of the fingers is substantially a semi-circle in order to impart a thorough mixing and whirling motion to the gas, or vapor. It will be particularly observed that the ends of the curved fingers where they engage the inner surface of the pipe 2 are somewhat farther away or a greater distance from the flange 5 than the point 19 where the fingers meet in the axis. This structure has the effect of imparting a decided rotary motion to the gaseous mixture.

In order to make the description clear, the term "outer ends" refers to the extreme delivery ends of the fingers, and the term "outer edges" refers to the edges 15'. The locus of the points $15^2$ is a circle whose radius is equal to the radius of the base part. The point 19 is a point in the axis of the device where the inwardly extending curved edges $15^3$ of the fingers intersect with the curved edges at the delivery ends $15^4$ of the fingers.

What I claim is:

1. An article for the purpose described, having a plurality of curved fingers that are spaced from each other at their outer side edges, the inwardly extending curved edges $15^3$ of the delivery ends $15^4$ of the curved portions of the fingers intersecting with the curved ends $15^4$ of the delivery end portions of the fingers and meeting in the axis 19 of the article and their outer side edges 15'. being located in a curve the locus of which is a cylinder and of a diameter which is equal to the base portion of the article, each of said fingers being bent at their outer delivery ends 15ᵃ into a form that is substantially a semi-circle.

2. A device for imparting rotary motion to a gaseous mixture when the same is drawn or forced through the device and comprising a member that is formed with finger-like elements, their outer or delivery end portions being curved inward to a point coinciding with the axis of the member.

3. A mixing device comprising a cylindrical shaped member having finger-like elements that are curved so that the inner points of the delivery ends of the fingers meet in or near the axis of said member and their outer points are at a distance from the axis equal to the radius of the base portion.

4. A device for the purpose described, comprising an elongated cylindrical member adapted to be secured in a pipe; curved finger elements, the curvature of which is substantially semi-circular and having the points formed by the inter-section of their inner edges and curved delivery outer ends meeting in the axis of the cylinder.

FRANK M. LIVINGSTONE.